United States Patent
Vahala et al.

(10) Patent No.: US 11,326,884 B2
(45) Date of Patent: May 10, 2022

(54) STIMULATED BRILLOUIN RING LASER GYROSCOPE WITH OPTICAL FREQUENCY OFFSET OF COUNTERPROPAGATING PUMP LASER SIGNALS

(71) Applicant: California Institute of Technology, Pasadena, CA (US)

(72) Inventors: Kerry Vahala, Pasadena, CA (US); Jiang Li, Pasadena, CA (US); Yu-Hung Lai, Pasadena, CA (US); Myoung-Gyun Suh, Pasadena, CA (US); Seung Hoon Lee, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 309 days.

(21) Appl. No.: 16/789,404

(22) Filed: Feb. 12, 2020

(65) Prior Publication Data

US 2021/0278215 A1    Sep. 9, 2021

Related U.S. Application Data

(60) Provisional application No. 62/804,922, filed on Feb. 13, 2019.

(51) Int. Cl.
*G01C 19/66* (2006.01)
*G01C 19/72* (2006.01)
(Continued)

(52) U.S. Cl.
CPC .......... *G01C 19/727* (2013.01); *G01C 19/64* (2013.01); *G01C 19/661* (2013.01);
(Continued)

(58) Field of Classification Search
CPC .... G01C 19/727; G01C 19/64; G01C 19/661; G01C 19/665; G01C 19/726;
(Continued)

(56) References Cited

U.S. PATENT DOCUMENTS 10,928,200 B1 *   2/2021   Wu ................... H01S 3/094076
2017/0067743 A1 * 3/2017   Salit ..................... G01C 19/661

OTHER PUBLICATIONS

Lai, Y., Suh, M., Lu, Y. et al. Earth rotation measured by a chip-scale ring laser gyroscope. Nat. Photonics (2020). Received: Sep. 16, 2019; Accepted: Jan. 10, 2020; Published: Feb. 17, 2020. https://doi.org/10.1038/s41566-020-0588-y.

(Continued)

*Primary Examiner* — Jonathan M Hansen
(74) *Attorney, Agent, or Firm* — David S. Alavi

(57) ABSTRACT

A disk resonator is pumped by counterpropagating pump signals to produce corresponding counterpropagating Brillouin laser signals. The pump laser optical frequencies are separated by a frequency offset $\Delta v_P$ but excite the same nominal resonator optical mode; the Brillouin laser optical frequencies are separated by a beat frequency $\Delta v_L$ with $0 < \Delta v_L < \Delta v_P$. A photodetector receives the Brillouin laser signals and produces an electrical signal at the beat frequency $\Delta v_L$. The frequency offset $\Delta v_P$ can be large so enough to prevent locking of the Brillouin laser signals onto a common Brillouin laser frequency. A signal processing system derives from the beat frequency $\Delta v_L$ an estimated angular velocity component of the disk optical resonator about an axis substantially perpendicular to the disk optical resonator.

33 Claims, 8 Drawing Sheets

(51) Int. Cl.
  H01S 3/00     (2006.01)
  H01S 3/094    (2006.01)
  H01S 3/30     (2006.01)
  G01C 19/64    (2006.01)

(52) U.S. Cl.
  CPC .......... G01C 19/665 (2013.01); H01S 3/0085 (2013.01); H01S 3/094096 (2013.01); H01S 3/30 (2013.01)

(58) Field of Classification Search
  CPC .... H01S 3/0085; H01S 3/094096; H01S 3/30; H01S 3/005; H01S 3/0604; H01S 3/1305; H01S 3/1304
  See application file for complete search history.

(56) References Cited

OTHER PUBLICATIONS

Lai, Y., Lu, Y., Suh, M. et al. Observation of the exceptional-point-enhanced Sagnac effect. Nature 576, 65-69 (2019). Received: Apr. 10, 2019; Accepted: Aug. 27, 2019; Published: Dec. 4, 2019. https://doi.org/10.1038/s41586-019-1777-z.

Jiang Li, Myoung-Gyun Suh, and Kerry Vahala, "Microresonator Brillouin gyroscope," Optica 4, 346-348 (2017) Received: Nov. 14, 2016; Accepted: Feb. 9, 2017; Published: Mar. 7, 2017. https://doi.org/10.1364/OPTICA.4.000346.

Jiang Li, Hansuek Lee, Tong Chen, and Kerry J. Vahala, "Characterization of a high coherence, Brillouin microcavity laser on silicon," Opt. Express 20, 20170-20180 (2012). Received: Jul. 2, 2012; Accepted: Aug. 12, 2012; Published: Aug. 20, 2012. https://doi.org/10.1364/OE.20.020170.

K. Vahala, Y. Lai, M. Suh, and J. Li, "A Brillouin Gyroscope Using Chip-Integrable High-Q Optical Cavities," in Advanced Photonics 2018 (BGPP, IPR, NP, NOMA, Sensors, Networks, SPPCom, SOF), OSA Technical Digest (online) (Optical Society of America, 2018), paper IM3I2. https://doi.org/10.1364/IPRSN.2018.IM3I.2.

K. Vahala, Y. H. Lai, and M. G. Suh, "An On-chip Optical Brillouin Gyroscope with Earth-Rotation-Rate Sensitivity," in Conference on Lasers and Electro-Optics, OSA Technical Digest (Optical Society of America, 2019), paper FTu3B.1. https://doi.org/10.1364/CLEO_QELS.2019.FTu3B.1.

Y. Lai, M. Suh, Y. Lu, B. Shen, Q. Yang, J. Li, S. H. Lee, K. Y. Yang, and K. J. Vahala, "Measurement of the Earth's Rotation Using a Chip-Based Brillouin Laser Gyroscope," in Conference on Lasers and Electro-Optics, OSA Technical Digest (Optical Society of America, 2019), paper JTh5A.8. https://doi.org/10.1364/CLEO_AT.2019.JTh5A.8.

* cited by examiner

STIMULATED BRILLOUIN RING LASER GYROSCOPE WITH OPTICAL FREQUENCY OFFSET OF COUNTERPROPAGATING PUMP LASER SIGNALS

BENEFIT CLAIMS TO RELATED APPLICATIONS

This application claims benefit of U.S. provisional App. No. 62/804,922 entitled "Solid state unlocking for a solid-state optical gyro using stimulated Brillouin laser" filed Feb. 13, 2019 in the names of Vahala et al, said provisional application being hereby incorporated by reference as if fully set forth herein.

STATEMENT REGARDING FEDERALLY SPONSORED RESEARCH

This invention was made with government support under Grant No. N66001-16-1-4046 awarded by the US NAVY. The government has certain rights in the invention.

FIELD OF THE INVENTION

The field of the present invention relates to ring laser gyroscopes. In particular, an inventive ring laser gyroscope is disclosed that employs optical frequency offset of counterpropagating laser modes to avoid frequency locking.

BACKGROUND

A ring laser gyroscope employs counterpropagating laser resonator modes. The Sagnac effect causes the optical frequencies of those counterpropagating modes to shift in opposite directions. Directing laser output from the counterpropagating modes onto a common photodetector results in an electrical signal at the beat frequency between those modes. Rotation of the ring laser resonator results in a shift of the beat frequency that is proportional to an angular velocity component perpendicular to the ring.

In a so-called degenerate ring laser gyroscope, the counterpropagating modes resonate in the same nominal resonator mode at the same optical frequency with the resonator at rotational rest (i.e., not rotating). With the resonator at rotational rest, the beat frequency would be zero. In principle that is a desirable mode of operation, because the resulting angular velocity measurement has no offset, i.e., zero angular velocity corresponds to a beat frequency of zero (no beat signal), and rotation of the resonator results in beat frequencies that are relatively low (e.g., typically tens or hundreds of kHz or less, often much less) and therefore relatively easy to measure accurately. Unfortunately, unavoidable optical coupling between the counterpropagating laser resonator modes tends to lock them together at a common frequency if they are too close together (e.g., within a few kHz or a few tens of kHz). The result is a so-called dead band at low or zero angular velocity that cannot be measured by the ring laser gyroscope, because the counterpropagating modes are locked together and therefore produce no beat signal. Only when the angular velocity of the resonator is high enough, and the corresponding Sagnac shift large enough, do the counterpropagating laser modes unlock and produce a beat signal indicative of the angular velocity. Various schemes exist for mitigating this dead band. In one example, the ring laser gyroscope can be mounted on a rotatable platform that oscillates (dithers) and thereby breaks the frequency lock between the counterpropagating laser modes. However, that solution introduces complexity and moving parts.

Another solution is to employ a so-called non-degenerate ring laser gyroscope, in which the counterpropagating laser modes resonate in different nominal resonator modes at optical frequencies far enough apart that they do not lock together. One example of such a non-degenerate ring laser gyroscope is disclosed in provisional App. No. 62/804,922 (referenced above). The counterpropagating laser modes in that device are counterpropagating first and second Stokes-shifted Brillouin laser modes in a silica disk resonator, and are separated by the Brillouin frequency of about 10.8 GHz. Those laser modes never lock together, allowing measurements near or at zero angular velocity. However, the beat frequency corresponding to zero angular velocity is 10.8 GHz. To measure relatively small angular velocity, the signal processing system must enable measurement of relatively small frequency shifts (e.g., a few Hz up to a few tens of kHz) of a signal at multiple GHz. That is a technically demanding measurement, requiring a high-speed photodetector and expensive, high-end signal processing equipment.

SUMMARY

An inventive ring laser gyroscope includes a disk optical resonator, a pump laser source, a frequency-locking mechanism, and a photodetector. The disk optical resonator is (i) characterized by a free spectral range $v_{FSR}$, a finesse F, and a Brillouin shift frequency $v_B$, and (ii) arranged so that corresponding optical frequencies of at least one pair of resonant optical modes supported by the disk optical resonator differ by about $v_B$. The pump laser source produces first and second pump optical signals at respective pump optical frequencies $v_{P1}$ and $v_{P2}$, and launches those pump optical signals to counterpropagate around the disk optical resonator. The second pump optical frequency $v_{P2}$ is equal to either $v_{P1}+\Delta v_P$ or $v_{P1}-\Delta v_P$; $\Delta v_P$ is between about $0.0010 \cdot v_{FSR}/F$ and about $10 \cdot v_{FSR}/F$. The frequency-locking mechanism couples the pump laser source and the disk optical resonator and controls the first pump optical frequency $v_{P1}$, the second pump optical frequency $v_{P2}$, or a laser optical frequency $v_{P0}$ to maintain resonant propagation around the disk optical resonator of at least one signal among the first pump optical signal, the second pump optical signal, or a laser output optical signal characterized by a laser optical frequency $v_{P0}$.

The photodetector receives first and second stimulated Brillouin laser output optical signals, resulting from pumping by the first and second pump optical signals, respectively. The first and second stimulated Brillouin laser output optical signals resonantly counterpropagate around the disk optical resonator and are characterized by respective first and second Brillouin laser frequencies $v_{L1}$ (about equal to $v_{P1}-v_B$) and $v_{L2}$ (about equal to $v_{P2}-v_B$). From the received laser output optical signals, the photodetector produces an electrical signal at a beat frequency $\Delta v_L=|v_{L1}-v_{L2}|$ with $0<\Delta v_L<\Delta v_P$. The frequency difference $\Delta v_P$ between the first and second pump optical frequencies $v_{P1}$ and $v_{P2}$ can be sufficiently large so as to substantially prevent locking of the first and second Brillouin laser optical signals onto a common Brillouin laser frequency, thereby maintaining $v_{L1} \neq v_{L2}$. The ring laser gyroscope can include a signal processing system coupled to the photodetector and arranged to derive from the beat frequency $\Delta v_L$ an estimated angular velocity component of the disk optical resonator about an axis substantially perpendicular to the disk optical resonator. Such a signal processing system can be characterized by (i)

a null beat frequency $\Delta v_{L0}$ that corresponds to the angular velocity component being zero, and (ii) a scale factor K selected so that the estimated angular velocity component is given by $K \cdot (\Delta v_L - \Delta v_{L0})$.

Objects and advantages pertaining to ring laser gyroscopes may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
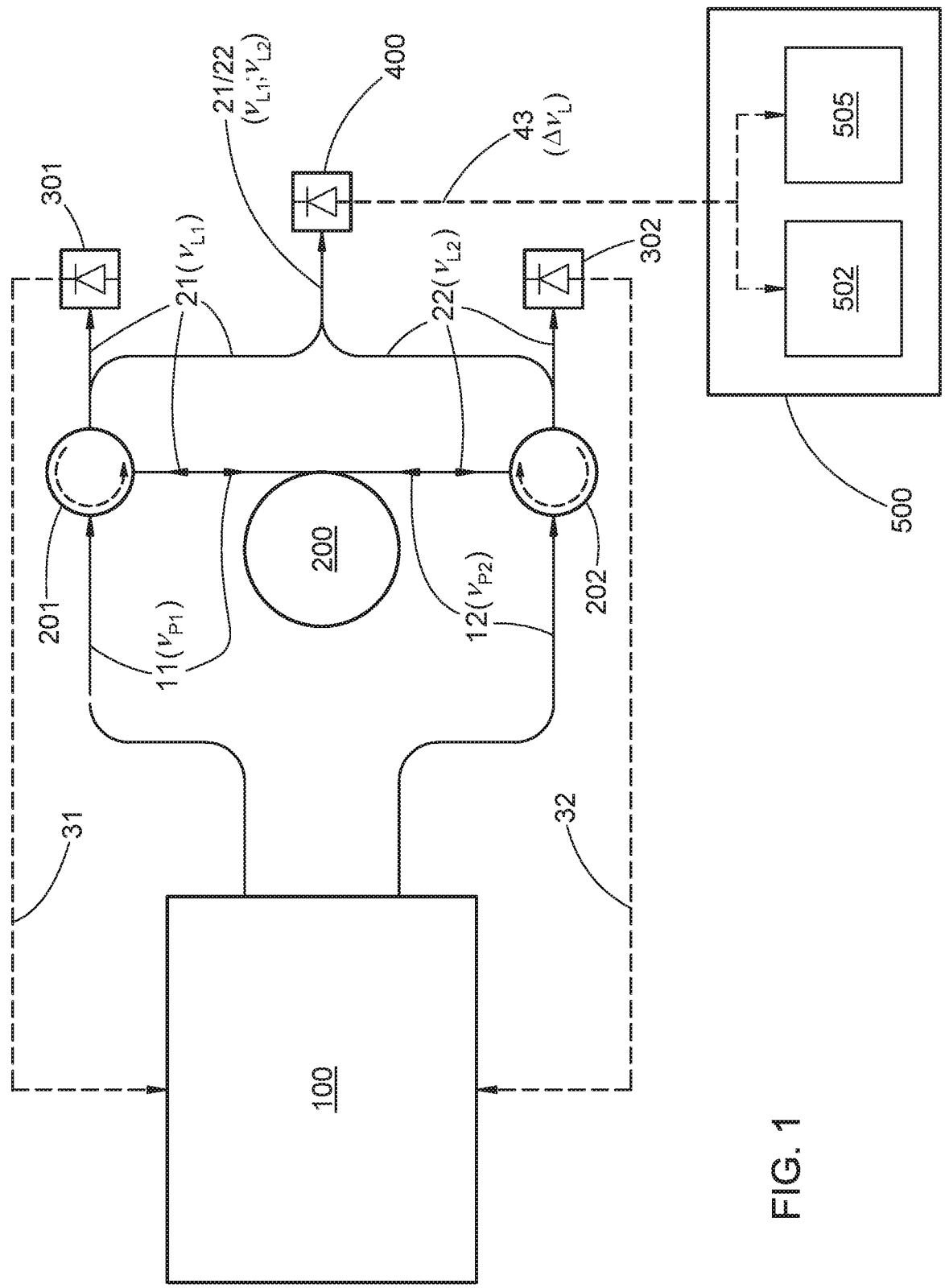
FIG. 1 is a schematic diagram of an inventive ring laser gyroscope

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION OF EMBODIMENTS

It would be desirable to provide a ring laser gyroscope that does not suffer from a so-called dead band around zero angular velocity, that does not require moving parts, does not require a high-speed photodetector (i.e., GHz bandwidth), and does not require measurement of relatively small frequency shifts of GHz frequency signals. Various examples of inventive ring laser gyroscopes are disclosed herein that employ counterpropagating laser modes that are resonant in the same nominal resonator mode, but frequency-shifted sufficiently to avoid locking of their optical frequencies. The inventive ring laser gyroscopes are therefore non-degenerate, but the frequency offset between the counterpropagating laser resonator modes (with the resonator at rotational rest) is on the order of several kHz to several hundred kHz, obviating the need for high-speed detectors or high-performance signal processing equipment.

Various examples of an inventive ring laser gyroscope are shown in FIGS. 1 and 2A-2D. An inventive ring laser gyroscope includes a disk optical resonator 200, a pump laser source 100, a frequency-locking mechanism, and a photodetector 400.

The disk optical resonator 200 is characterized by a free spectral range $v_{FSR}$, a finesse F, and a Brillouin shift frequency $v_B$. Corresponding optical frequencies of at least one pair of resonant optical modes supported by the disk optical resonator 200 differ by about $v_B$, so that the disk resonator 200 can support stimulated Brillouin laser oscillation when pumped at a pump laser wavelength that is locked to a mode frequency of the disk resonator 200. Any suitable material can be employed for the disk resonator; a common material is silica (doped or undoped), and the corresponding Brillouin shift frequency $v_B$ is about 10.8 GHz. In some examples the Brillouin shift frequency $v_B$ is about equal to an integer multiple of the free spectral range $v_{FSR}$. In such examples the mode to which the pump laser is locked and the mode in which stimulated Brillouin laser oscillation occurs are of the same mode family. In other examples, those modes can belong to different mode families, and the Brillouin shift frequency $v_B$ may not be an integer multiple of the free spectral range $v_{FSR}$. In some typical examples the Brillouin shift frequency $v_B$ is less than 20 times larger than the free spectral range $v_{FSR}$, less than 10 times larger than the free spectral range $v_{FSR}$, or less than 5 times larger than the free spectral range $v_{FSR}$. In some typical examples the free spectral range $v_{FSR}$ is between about 0.10 GHz and about 20. GHz. In one specific example, the silica disk resonator 36 mm in diameter yields $v_B/v_{FSR}$ about equal to 6; in another specific example, a silica disk resonator 18 mm in diameter yields $v_B/v_{FSR}$ about equal to 3. For proper operation of the ring laser gyroscope, it is desirable that the disk resonator 200 exhibit a relatively large quality factor Q. Accordingly, in some examples the disk optical resonator 200 is characterized by a quality factor Q that is between about $1.0 \times 10^5$ and about $1.0 \times 10^{11}$; in some examples the disk optical resonator 200 is characterized by a quality factor Q that is between about $1.0 \times 10^7$ and about $1.0 \times 10^9$.

The pump laser source 100 produces first and second pump optical signals 11/12. The first pump optical signal 11 is characterized by a first pump optical frequency $v_{P1}$ and at least a portion of it is launched to propagate around the disk optical resonator in a forward direction (clockwise in FIG. 1). The second pump optical signal 12 is characterized by a second pump optical frequency $v_{P2}$ and at least a portion of it is launched to propagate around the disk optical resonator in a backward direction (counterclockwise in FIG. 1). Note that the designations forward versus backward, and clockwise versus counterclockwise, are arbitrary, and are only used to indicate relative propagation directions around the disk resonator 100. Optical fibers and circulators 201/202 are typically employed for conveying optical signals between or within the pump laser source 200, the disk optical resonator 100, and the photodetector; transverse optical coupling (also referred to as directional coupling or evanescent-wave coupling) between a suitably adapted segment of optical fiber and an outer circumference of the disk optical resonator serves to couple optical signals into and out of the resonator 100. The first and second pump optical signals are separated by a pump frequency offset $\Delta v_P$ that is between about $0.0010 \cdot v_{FSR}/F$ and about $10. \cdot v_{FSR}/F$, and either $v_{P2} = v_{P1} + \Delta v_P$ or $v_{P2} = v_{P1} - \Delta v_P$. In some examples, $\Delta v_P$ is greater than about $0.010 \cdot v_{FSR}/F$ or less than about $v_{FSR}/F$.

In many examples the laser source 100 includes a pump laser and one or more optical modulators. The pump laser can be of any suitable type or arrangement; many examples can include, e.g., a semiconductor laser, a semiconductor amplifier, an optical fiber laser, or a doped fiber amplifier. In the examples of FIGS. 2A-2D, the pump laser source 100 includes a semiconductor laser 205 (e.g., an external-cavity diode laser) and an amplifier 207 (e.g., an erbium-doped fiber amplifier).

The pump laser produces a laser output optical signal 10 characterized by a laser optical frequency $v_{P0}$. In various examples the laser optical frequency $v_{P0}$ is between about 75 THz and about 750 THz (vacuum wavelengths between about 400 nm and about 4 μm), between about 120 THz and about 430 THz (vacuum wavelengths between about 700 nm and about 2.5 μm), or between about 150 THz and about 300 THz (vacuum wavelengths between about 1.0 μm and about 2.0 μm). The one or more optical modulators can be driven in some examples at a single modulator frequency $f_M$. In some other examples each one of the one or more modulators can be driven at one or the other of two different modulator frequencies $f_{M1}$ and $f_{M2}$. The one or more optical modulators can be of any suitable type or arrangement, and can include one or more phase modulators, acousto-optic modulators, electro-optic modulators, intensity modulators, quadrature phase-shift keying modulators, or single-sideband modulators. The one or more modulators receive at least a portion of the laser output optical signal 10 and generate sideband optical signals characterized by corresponding sideband optical frequencies ($v_{P0} \pm f_M$ if a single modulator frequency is used; $v_{P0} \pm f_{M1}$ and $v_{P0} \pm f_{M2}$ if two modulator frequencies are used). Additional sidebands might be present, but typically are not utilized in the presently disclosed examples. At least one of the first or second pump optical signals 11/12 is one of the sideband optical signals; in some examples both of the first and second pump optical signals 11/12 are sideband optical signals. The pump laser source 200 can include a reference frequency source 203 that produces a reference electrical signal characterized by the modulator frequency $f_M$ and applies the reference electrical signal to the one or more modulators (typically amplified to achieve a necessary or desired level of modulation efficiency). Two such sources 203-1 and 203-2 can be employed to provide two different modulator frequencies $f_{M1}$ and $f_{M2}$. The reference frequency source(s) can be of any suitable type or arrangement that provides a sufficiently stable modulator frequency $f_M$. The sufficiency of that stability is determined by the precision desired from the ring laser gyroscope. In some examples the reference frequency source 203 can be a crystal oscillator (e.g., quartz) operating at several tens or several hundreds of kHz; such an oscillator can exhibit stability of the modulator frequency $f_M$ on the order of, e.g., one part in $10^8$ if temperature stabilized, and can be employed where it is neither necessary nor desirable to vary the modulator frequency $f_M$. An atomic clock can be employed and can provide frequency stability on the order of one part in $10^{11}$, and also is not variable. If variation of the modulator frequency is needed or desired, a tunable frequency reference source 203 can be employed.

In some examples (e.g., as in FIG. 2A), the first pump optical signal 11 can be a portion of the laser output optical signal, and is characterized by the laser optical frequency $v_{P0} = v_{P1}$. The second pump optical signal can be one of the sideband optical signals produced by the modulator 212 driven at the modulation frequency $f_M$ provided by the reference frequency source 203; the second pump optical frequency $v_{P2}$ can be either the sideband optical signal characterized by the sideband optical frequency $v_{P0}+f_M$ or the sideband optical signal characterized by the sideband optical frequency $v_{P0}-f_M$. The pump frequency offset $\Delta v_P$ is equal to the modulator frequency $f_M$.

In some other examples (e.g., as in FIGS. 2B and 2D), the modulators 211/212 can be driven at the modulation frequency $f_M$ provided by the reference frequency source 203. The first pump optical signal 11 is the sideband optical signal characterized by the sideband optical frequency $v_{P0}+f_M$, so that the first pump optical frequency $v_{P1} = v_{P0}+f_M$. The second pump optical signal 12 is the sideband optical signal characterized by the sideband optical frequency $v_{P0}-f_M$, so that the second pump optical frequency $v_{P2} = v_{P0}-f_M$. In this arrangement, the pump frequency offset $\Delta v_P$ is equal to twice the modulator frequency $f_M$.

In some other examples (e.g., as in FIG. 2C), the modulators 211/212 can be driven at different respective modulation frequencies $f_{M1}$ and $f_{M2}$ provided by corresponding reference frequency sources 203-1 and 203-2. The first pump optical signal 11 can be the sideband optical signal characterized by the sideband optical frequency $v_{P0}+f_{M1}$, so that the first pump optical frequency $v_{P1} = v_{P0}+f_{M1}$. The second pump optical signal 12 can be the sideband optical signal characterized by the sideband optical frequency $v_{P0}-f_{M2}$, so that the second pump optical frequency $v_{P2} = v_{P0}-f_{M2}$. In this arrangement, the pump frequency offset $\Delta v_P$ is equal to $f_{M1}+f_{M2}$. Other combinations of sidebands can be employed, yielding either $\Delta v_P = f_{M1}+f_{M2}$ or $\Delta v_P = |f_{M1}-f_{M2}|$. It may be desirable to phase lock or otherwise stabilize the frequency sources 203-1 and 203-2 relative to one another.

To facilitate stimulated Brillouin laser oscillation in the disk optical resonator 200, and to achieve frequency stability of the resulting stimulated Brillouin laser output optical signals 21/22, a frequency-locking mechanism couples the pump laser source 100 and the disk optical resonator 200. The frequency-locking mechanism controls the first pump optical frequency $v_{P1}$, the second pump optical frequency $v_{P2}$, or the pump laser optical frequency $v_{P0}$ to maintain resonant propagation around the disk optical resonator 100 of at least a portion of the first pump optical signal 11, at least a portion of the second pump optical signal 12, or at least a portion of the pump laser optical signal 10. The frequency-locking mechanism can be of any suitable type or arrangement, including, e.g., a Pound-Drever-Hall mechanism or a Hänsch-Couillaud mechanism; a Pound-Drever-Hall mechanism is depicted in the drawings.

Figure 2A:
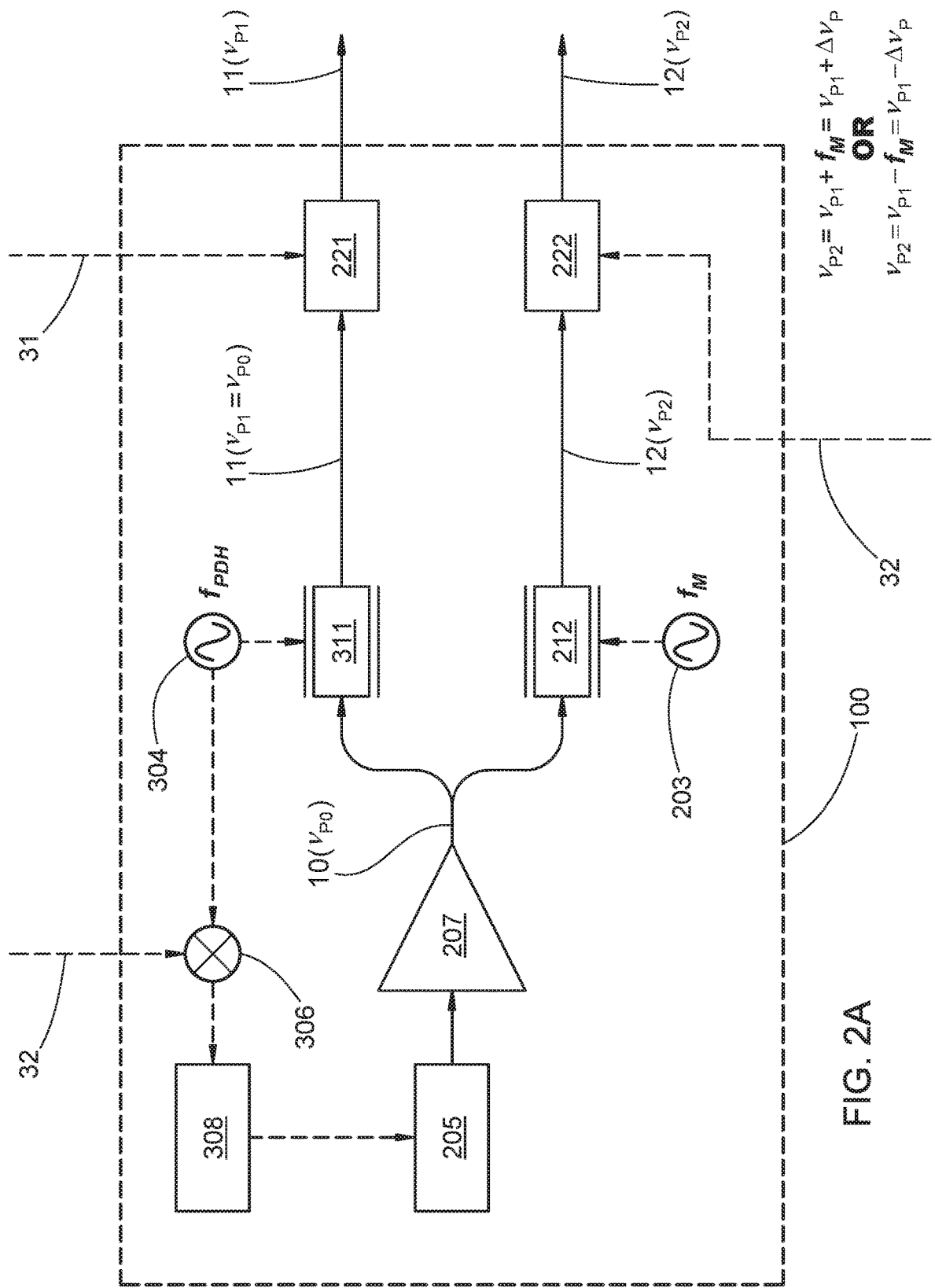
FIGS. 2A through 2D are schematic diagrams of several arrangements of pump laser sources for an inventive ring laser gyroscope.

In the example of FIG. 2A, the first pump optical frequency $v_{P1}$ (which is also the pump laser optical frequency $v_{P0}$) is controlled by the frequency-locking mechanism. A modulator 311 (of any suitable type) is driven at a frequency $f_{PDH}$ provided by the frequency reference 304 (of any suitable type or arrangement). A portion of the first pump optical signal 11 exiting the disk optical resonator 100 impinges on the photodetector 302. The electrical signal 32 from the photodetector 302 and an electrical reference signal at the frequency $f_{PDH}$ are combined at the mixer 306 (of any suitable type or arrangement), which provides an error signal to the servo mechanism 308 (of any suitable type or arrangement), which in turn controls the laser 206 to lock the frequency $v_{P1}$ (and $v_{P0}$) to a resonant mode of the disk resonator 100. Instead of locking the frequency $v_{P1}$, the second pump optical signal 12 can be modulated at the frequency $f_{PDH}$ (using a suitably positioned modulator), a portion of the second pump optical signal 12 exiting the resonator 100 can impinge on the photodetector 301, the electrical signal 31 from the photodetector 301 can be combined with the reference signal at the frequency $f_{PDH}$ at the mixer 306, and the resulting error signal can be used to control the laser 206 to lock the frequency $v_{P2}$ to a resonant mode of the disk resonator 100.

Figure 2B:
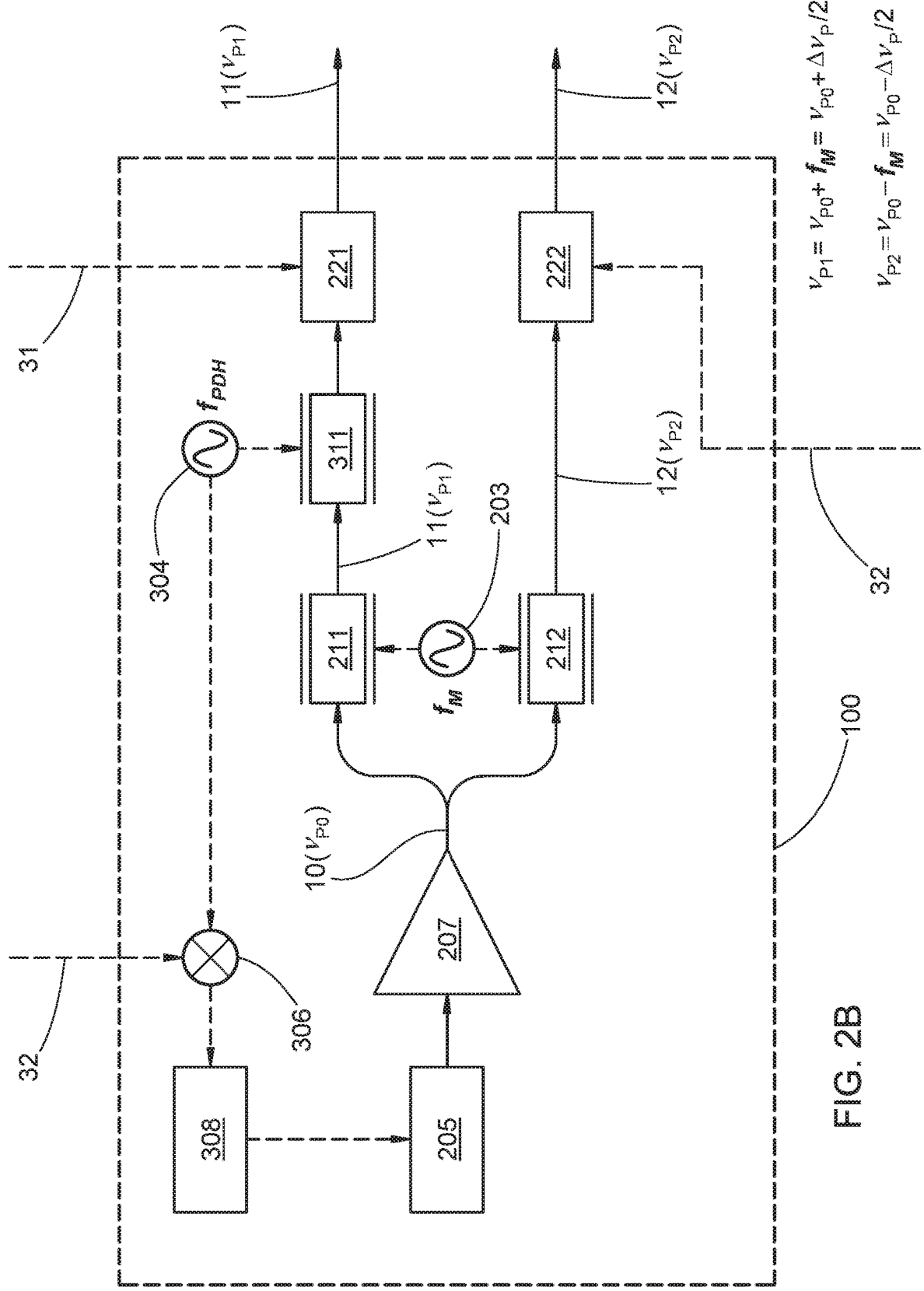
Figure 2C:
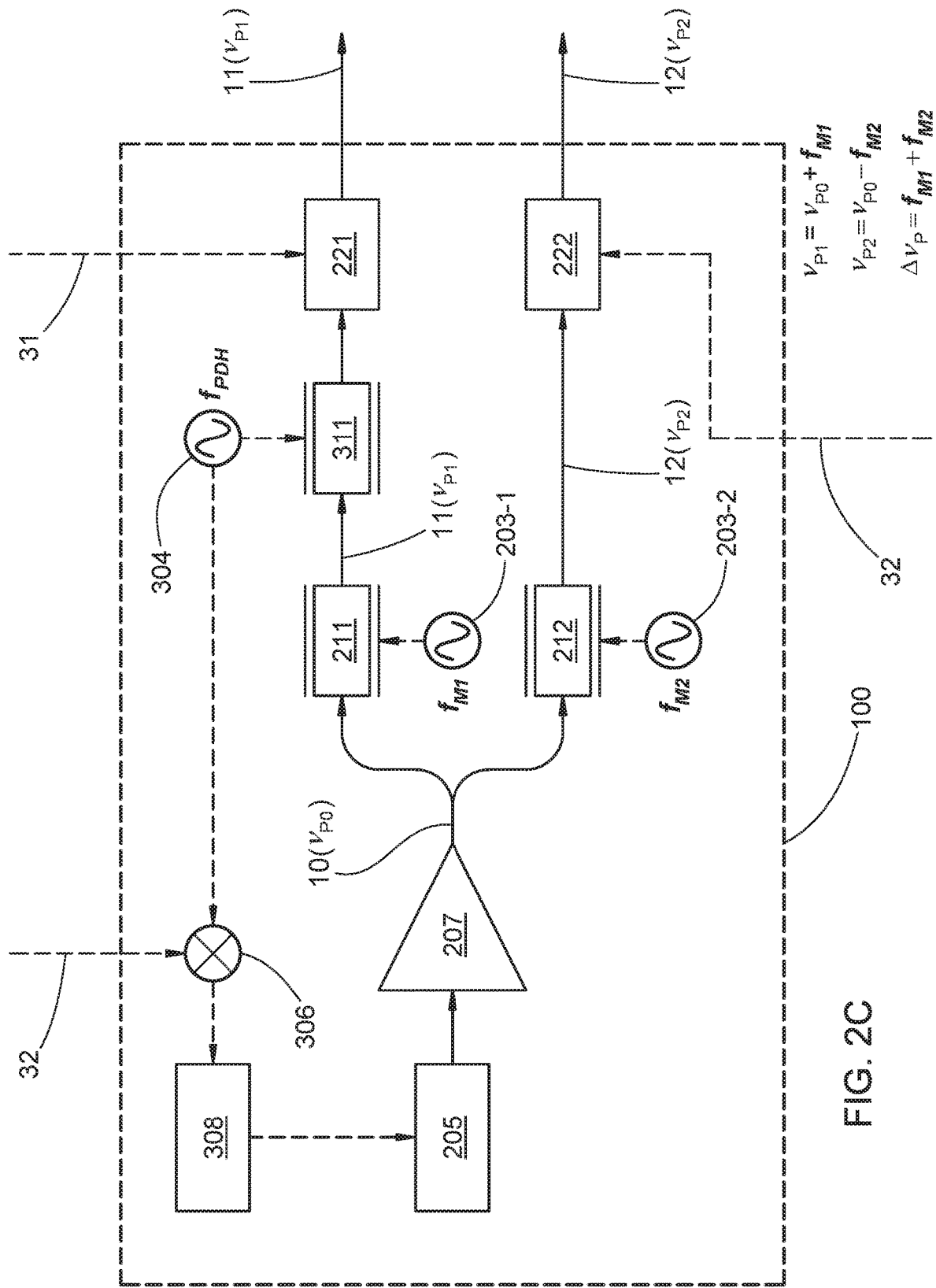

In the examples of FIGS. 2B and 2C, the first pump optical frequency ($v_{P1} = v_{P0}+f_M$ in FIG. 2B; $v_{P1} = v_{P0}+f_{M1}$ in FIG. 2C) is controlled by the frequency-locking mechanism. A modulator 311 (of any suitable type) is driven at a frequency $f_{PDH}$ provided by the frequency reference 304 (of any suitable type). A portion of the first pump optical signal 11 exiting the disk optical resonator 100 impinges on the photodetector 302. The electrical signal 32 from the photodetector 302 and an electrical reference signal at the frequency $f_{PDH}$ are combined at the mixer 306, which provides an error signal to the servo mechanism 308, which in turn controls the laser 206 to lock the frequency $v_{P1}$ to a resonant mode of the disk resonator 100. Instead of locking the frequency $v_{P1}$, the second pump optical signal 12 ($v_{P2}=v_{P0}-f_M$ in FIG. 2B; $v_{P2}=v_{P0}-f_{M2}$ in FIG. 2C) can be modulated at the frequency $f_{PDH}$ (using a suitably positioned modulator), a portion of the second pump optical signal 12 exiting the resonator 100 can impinge on the photodetector 302, the electrical signal 32 from the photodetector 302 can be combined with the reference signal at the frequency $f_{PDH}$ at the mixer 306, and the resulting error signal can be used to control the laser 206 to lock the frequency $v_{P2}$ to a resonant mode of the disk resonator 100.

Figure 2D:
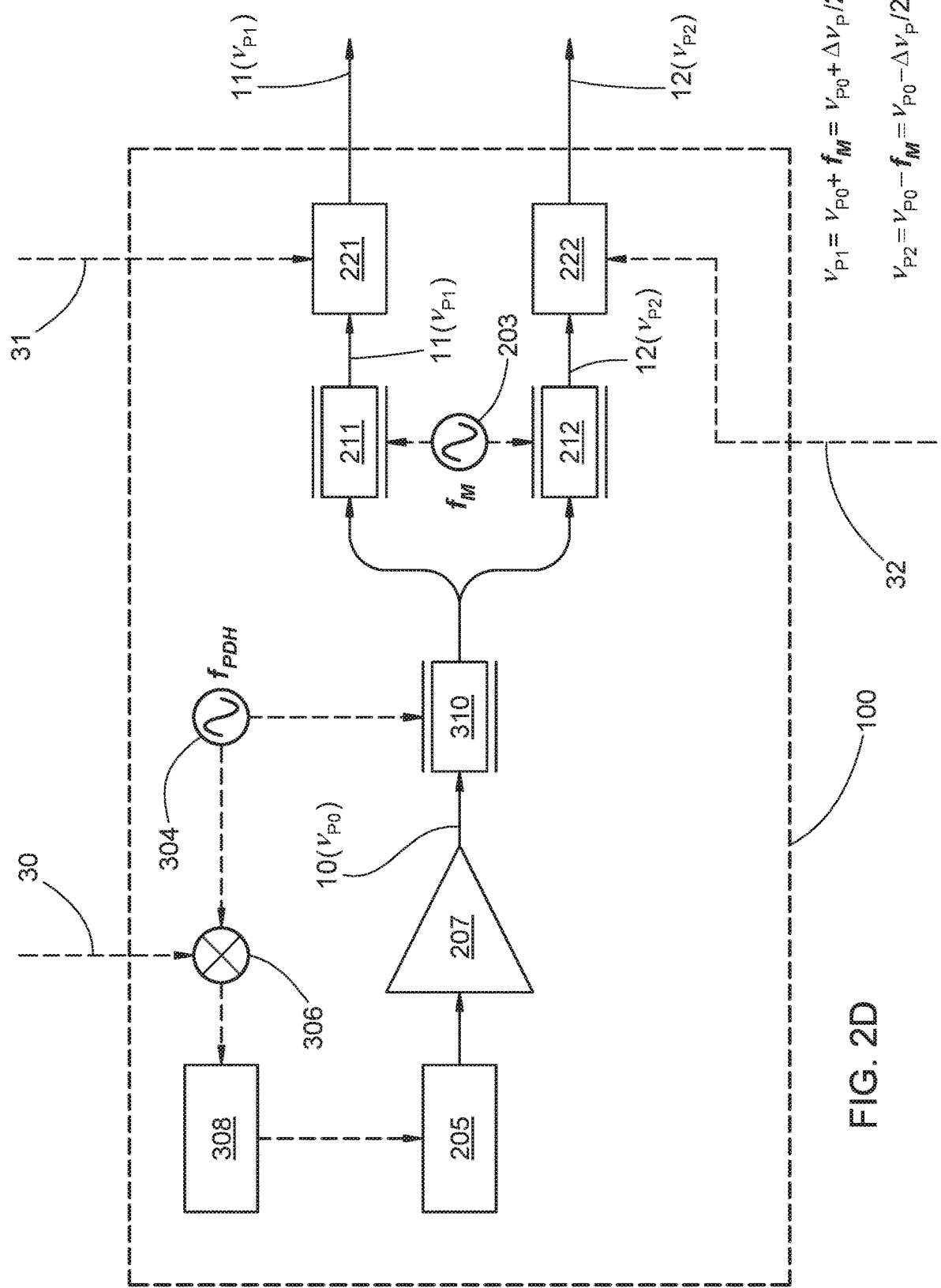

In the example of FIG. 2D, the pump laser optical frequency $v_{P0}$ is controlled by the frequency-locking mechanism. A modulator 310 (of any suitable type) is driven at a frequency $f_{PDH}$ provided by the frequency reference 304 (of any suitable type). A portion of the pump laser optical signal 10 propagates along with either or both of the pump optical signals 11/12, exits the disk optical resonator 100, and impinges on one or both photodetectors 301/302. Instead, a separate optical path can be provided to couple the pump laser signal 10 to the disk optical resonator 100, and a separate optical path and photodetector can be provided to collect a portion of the pump laser 10 exiting the resonator 100. A portion 30 of the electrical signal from the photodetector 301 or 302 (or separate photodetector, if present) and the electrical reference signal at the frequency $f_{PDH}$ are combined at the mixer 306, which provides an error signal to the servo mechanism 308, which in turn controls the laser 206 to lock the frequency $v_{P0}$ to a resonant mode of the disk resonator 100.

With one of the first or second pump optical frequencies $v_{P1}$ or $v_{P2}$, or the pump laser frequency $v_{P0}$, locked to a resonant mode of the disk resonator, the two pump optical signals 11/12 can drive stimulated Brillouin laser oscillation in the resonator 100. Because the pump frequency offset $\Delta v_P$ is sufficiently small, the counterpropagating Brillouin laser oscillations occur in the same nominal resonant mode of the resonator 100. The photodetector 400 receives a first stimulated Brillouin laser output optical signal 21, resulting from pumping by the first pump optical signal 11, that resonantly propagates around the disk optical resonator in the backward direction. The first stimulated Brillouin laser output signal 21 is characterized by a first Brillouin laser frequency $v_{L1}$ that is about equal to $v_{P1}-v_B$ (but not necessarily exactly, as discussed below). The photodetector 400 also receives a second stimulated Brillouin laser output optical signal 22, resulting from pumping by the second pump optical signal 12, that resonantly propagates around the disk optical resonator in the forward direction. The second stimulated Brillouin laser signal 22 is characterized by a second Brillouin laser frequency $v_{L2}$ that is about equal to $v_{P2}-v_B$, (but again not necessarily exactly, as discussed further below). The photodetector 400 produces from the two received stimulated Brillouin laser signals 21/22 an electrical output signal 43 at a beat frequency $\Delta v_L=|v_{L1}-v_{L2}|$ with $0<\Delta v_L<\Delta v_P$. The pump offset frequency $\Delta v_P$ is sufficiently large (e.g., greater than about $0.0010 \cdot v_{FSR}/F$, or greater than about $0.010 \cdot v_{FSR}/F$) so as to substantially prevent locking of the first and second Brillouin laser optical output signals 21/22 onto a common Brillouin laser frequency and thereby maintain $v_{L1} \neq v_{L2}$. The pump offset frequency $\Delta v_P$ is sufficiently small (e.g., less than about $10 \cdot v_{FSR}/F$, or less than about $v_{FSR}/F$) so that resonant oscillations at the two Brillouin laser frequencies $v_{L1}$ and $v_{L2}$ are supported by the same resonator optical mode.

The purpose of a ring laser gyroscope is to measure angular velocity. In particular, the Sagnac effect in the disk resonator 100 is proportional to the component of the resonator's angular velocity that is perpendicular to the disk. A navigational gyroscope typically would include three devices such as the inventive ring laser gyroscope disclosed herein, relatively oriented to enable measurement (i.e., estimation) of the direction and magnitude of angular velocity in three-dimensional space. To enable such measurement or estimation, a signal processing system 500 can be coupled to the photodetector 400. The signal processing system 500 can be of any suitable type or arrangement, and can be structured, programmed, calibrated, or otherwise arranged so as to derive from the beat frequency $\Delta v_L$ an estimated angular velocity component of the disk optical resonator 100 about an axis substantially perpendicular to the disk optical resonator 100. In some examples the signal processing system includes an electrical spectrum analyzer 502 or a frequency counter 505. The inventive ring laser gyroscope is a non-degenerate device, so the signal processing system can be characterized by (i) a null beat frequency $\Delta v_{L0}$ that corresponds to the angular velocity component being zero, and (ii) a scale factor K selected so that the estimated angular velocity component is given by $K \cdot (\Delta v_L - \Delta v_{L0})$. The inventive ring laser gyroscope can be calibrated by determining values for $\Delta v_{L0}$ and K. The scale factor K is determined by the material, size, and geometry of the disk optical resonator 200, which in turn determine the magnitude of the Sagnac effect. Stability of the value of K can be enhanced, e.g., by enclosing the resonator 200 within a temperature-stabilized housing. Note that measurement or estimation of the angular frequency components using the inventive ring laser gyroscope involves measuring small frequency shifts (e.g., 0.01 Hz to several tens of kHz) against a null beat frequency of a MHz or less (typically between about 10 kHz and about 100 kHz). That is a much easier and cheaper technical problem that measuring similar frequency shifts against a null beat frequency in the GHz range.

Determining a value for $\Delta v_{L0}$ can be more problematic, and error in that determination results in drift of the ring laser gyroscope (i.e., measuring a non-zero angular velocity component in the absence of such motion). If each stimulated Brillouin laser frequency $v_{L1}$ and $v_{L2}$ were shifted from its corresponding pump optical frequency $v_{P1}$ and $v_{P2}$ by exactly the Brillouin shift frequency $v_B$, then the null beat frequency $\Delta v_{L0}$ would simply be equal to $\Delta v_P = f_M$ and could therefore be quite accurately determined. However, relative offset of the pump optical frequencies $v_{P1}$ and $v_{P2}$ (separated by $\Delta v_P$) means that at most one (and maybe neither) of them can be centered on mode spectrum 601 of the optical mode to which one of the pump or laser optical frequencies is locked (i.e., the pump mode). In turn, at most one (and maybe neither) of the corresponding exactly-Brillouin-shifted counterpart frequencies (i.e., $v_{P1}-v_B$ and $v_{P2}-v_B$) can be centered on the mode spectrum 602 of the optical mode that supports the Brillouin laser oscillations in the disk resonator 200 (i.e., the lasing mode). The interaction between the stimulated Brillouin gain spectra (centered at the frequencies $v_{P1}-v_B$ and $v_{P2}-v_B$) and the mode spectrum 602 of the lasing mode shifts the stimulated Brillouin laser frequencies $v_{L1}$ and $v_{L2}$ toward the peak of the lasing mode spectrum. In particular, at a zero angular velocity component, the null beat frequency $\Delta\nu_{L0}$ is less than the pump frequency offset $\Delta\nu_P$. The null beat frequency $\Delta\nu_{L0}$ must be determined for each different disk resonator 200 and may also vary among different optical resonator modes supported by a given disk resonator 200.

Figure 3A:
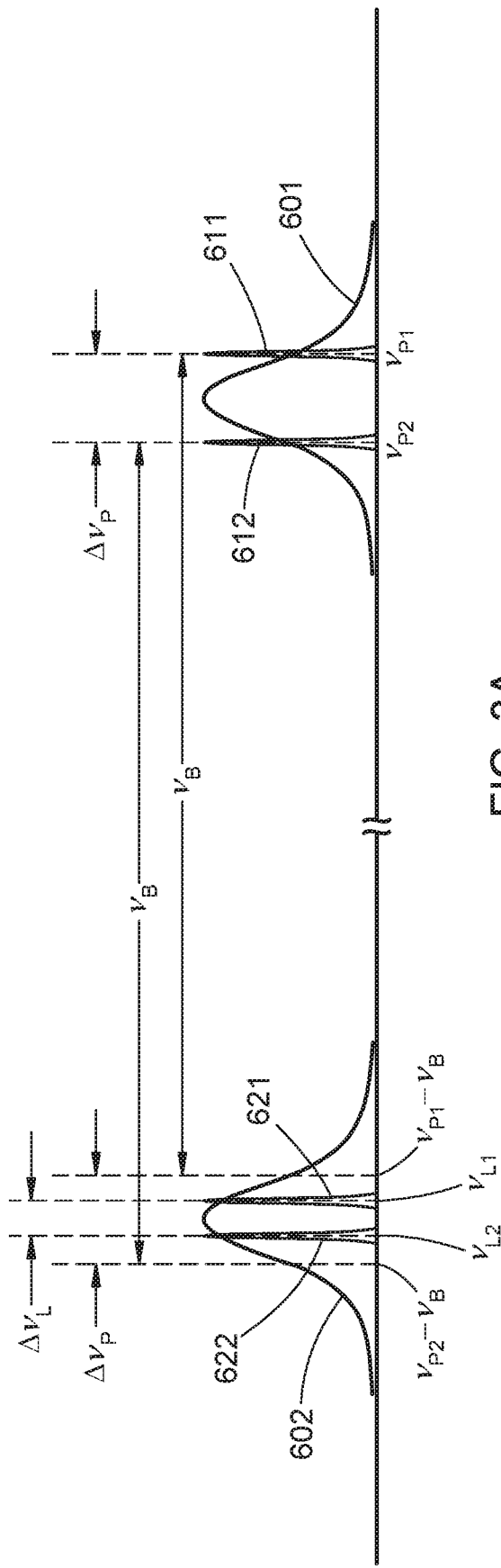
FIGS. 3A and 3B illustrate schematically pump optical spectral, Brillouin-shifted pump optical spectra, resonator mode spectra, and Brillouin laser optical spectra for two different arrangements of pump laser sources.

FIG. 3A shows the mode spectra 601/602, pump optical signal spectra 611/622 (centered at $\nu_{P1}$ and $\nu_{P2}$), and Brillouin laser spectra 621/622 (centered at $\nu_{L1}$ and $\nu_{L2}$) for an example wherein pump optical frequencies $\nu_{P1}$ and $\nu_{P2}$ and the corresponding Brillouin-shifted pump optical frequencies $\nu_{P1}-\nu_B$ and $\nu_{P2}-\nu_B$ are symmetrically disposed on opposite sides of the corresponding mode spectrum peaks 601/602. Such a situation can be achieved, e.g., by locking the pump laser frequency $\nu_{P0}$ to a resonant mode of a disk resonator 200 having $\nu_B=M\cdot\nu_{FSR}$ where M is an integer. Each of the Brillouin laser frequencies $\nu_{L1}$ and $\nu_{L2}$ is shifted toward the peak of the lasing mode spectrum 602 and therefore closer to each other, yielding $\Delta\nu_{L0}<\Delta\nu_P$.

Figure 3B:
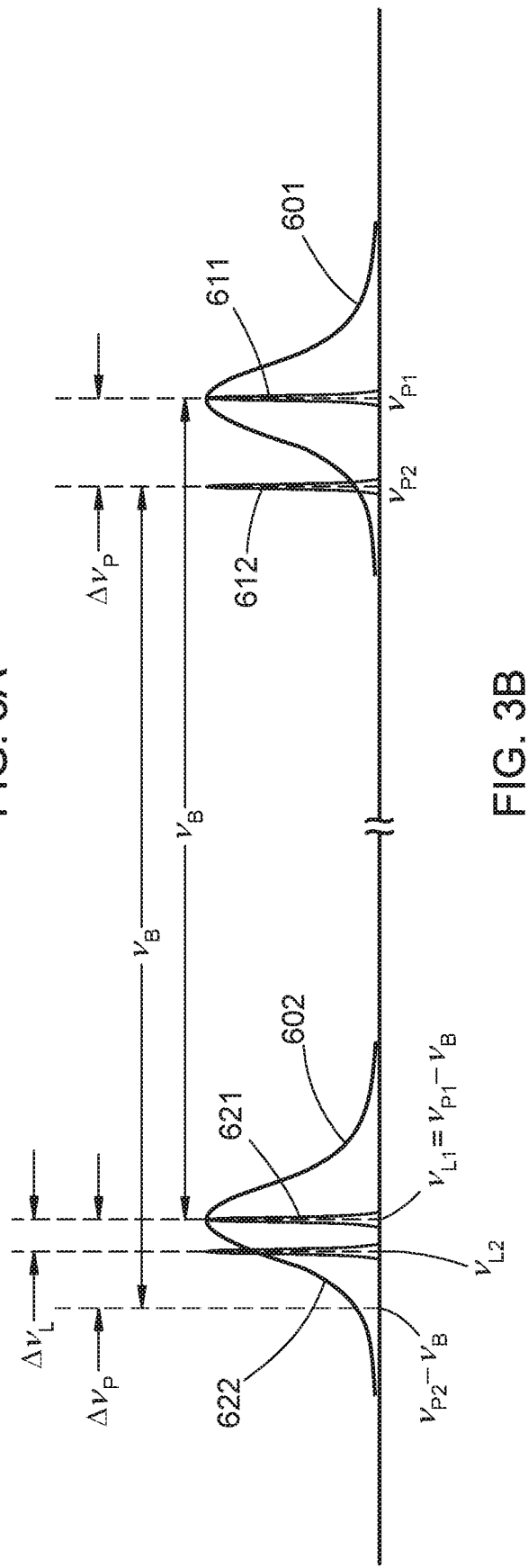

FIG. 3B shows the mode spectra 601/602, pump optical signal spectra 611/622 (centered at $\nu_{P1}$ and $\nu_{P2}$), and Brillouin laser spectra 621/622 (centered at $\nu_{L1}$ and $\nu_{L2}$) for an example wherein only one of the pump optical frequencies $\nu_{P1}$ or $\nu_{P2}$ ($\nu_{P1}$ shown in FIG. 3B) and its corresponding Brillouin-shifted pump optical frequency $\nu_{P1}-\nu_B$ or $\nu_{P2}-\nu_B$ ($\nu_{P1}-\nu_B$ shown in FIG. 3B) are centered on corresponding resonator mode spectra 601/602. The corresponding stimulated Brillouin laser optical frequency $\nu_{L1}$ or $\nu_{L2}$ ($\nu_{L1}$ shown in FIG. 3B) is equal to the corresponding Brillouin-shifted pump optical frequency and therefore also centered on the lasing mode spectrum 602. The other stimulated Brillouin laser optical frequency ($\nu_{L2}$ shown in FIG. 3B) is shifted toward the peak of the lasing mode spectrum 602 relative to the corresponding Brillouin-shifted pump optical frequency, so that $\Delta\nu_{L0}<\Delta\nu_P$. Such a situation can be achieved, e.g., by locking the first pump optical frequency $\nu_{P1}$ to a resonant mode of a disk resonator 200 having $\nu_B=M\cdot\nu_{FSR}$ where M is an integer.

Figures 4A, 4B:
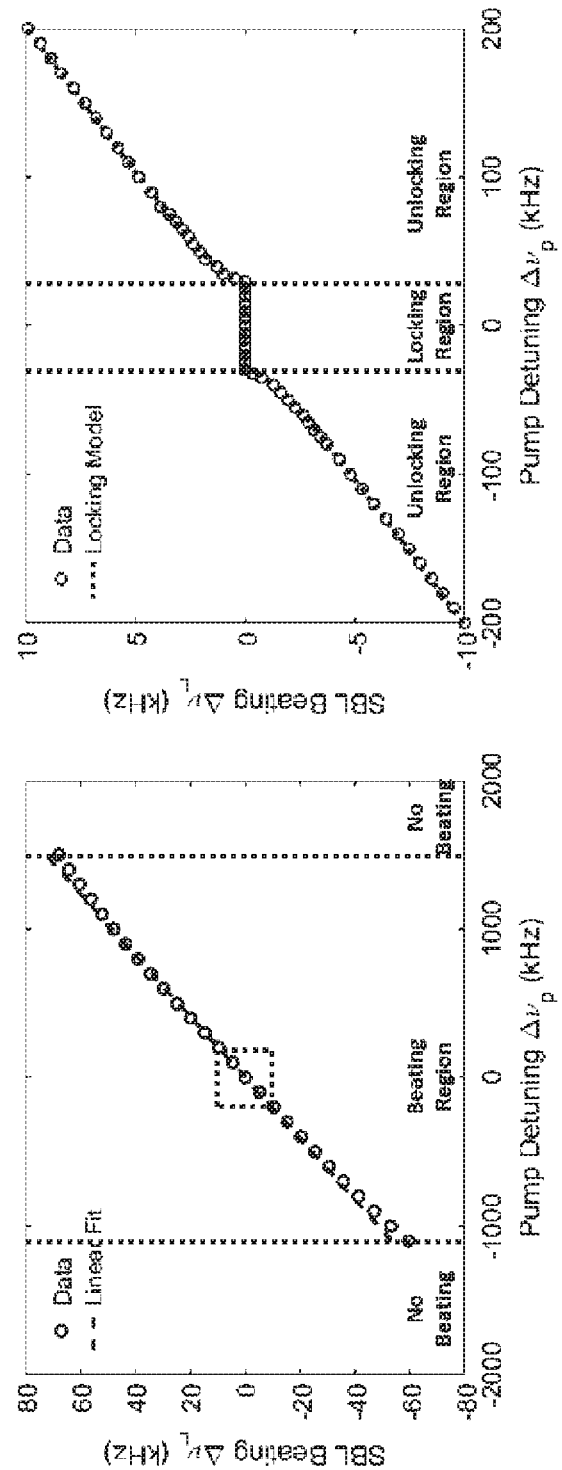
FIGS. 4A and 4B are plots of beat frequency as a function of pump frequency offset.

The graphs of FIGS. 4A and 4B illustrate the dependence of the null beat frequency $\Delta\nu_{L0}$ on the pump frequency offset $\Delta\nu_P$, which clearly exhibits the "frequency-pulling" behavior described above. The beat frequency was measured for a silica disk resonator 100 that is 36 mm in diameter, so that $\nu_B=6\cdot\nu_{FSR}=10.8$ GHz (for pump light having a vacuum wavelength near 1550 nm; $\nu_B$ varies with material and pump wavelength). The dependence is roughly linear, with the beat frequency $\Delta\nu_{L0}$ roughly a factor of ten smaller than the corresponding pump frequency offset $\Delta\nu_P$. Beating is observed over that entire range except near $\Delta\nu_P=0$. In FIG. 4B a central portion of the plot is enlarged to reveal a frequency range near $\Delta\nu_P=0$ where no beating occurs because the counterpropagating Brillouin laser signals 21/22 are locked together. That locking occurs over a range of pump frequency offsets $\Delta\nu_P$ less than about 20 to 30 kHz in magnitude; larger pump frequency offsets avoid locking, permit beating, and can be employed in an inventive ring laser gyroscope capable of measuring very small rotation rates. It has been observed, however, that during operation of the inventive ring laser gyroscope very near to the locking region (i.e., just outside the vertical dotted lines in FIG. 4B), the magnitude of the Sagnac shift is enhanced. Up to a fourfold increase in the value of the scale factor K has been observed, relative to its value when operating farther from the locking region. In some examples that enhancement can be exploited to increase the sensitivity of the inventive ring laser gyroscope.

Figure 5:
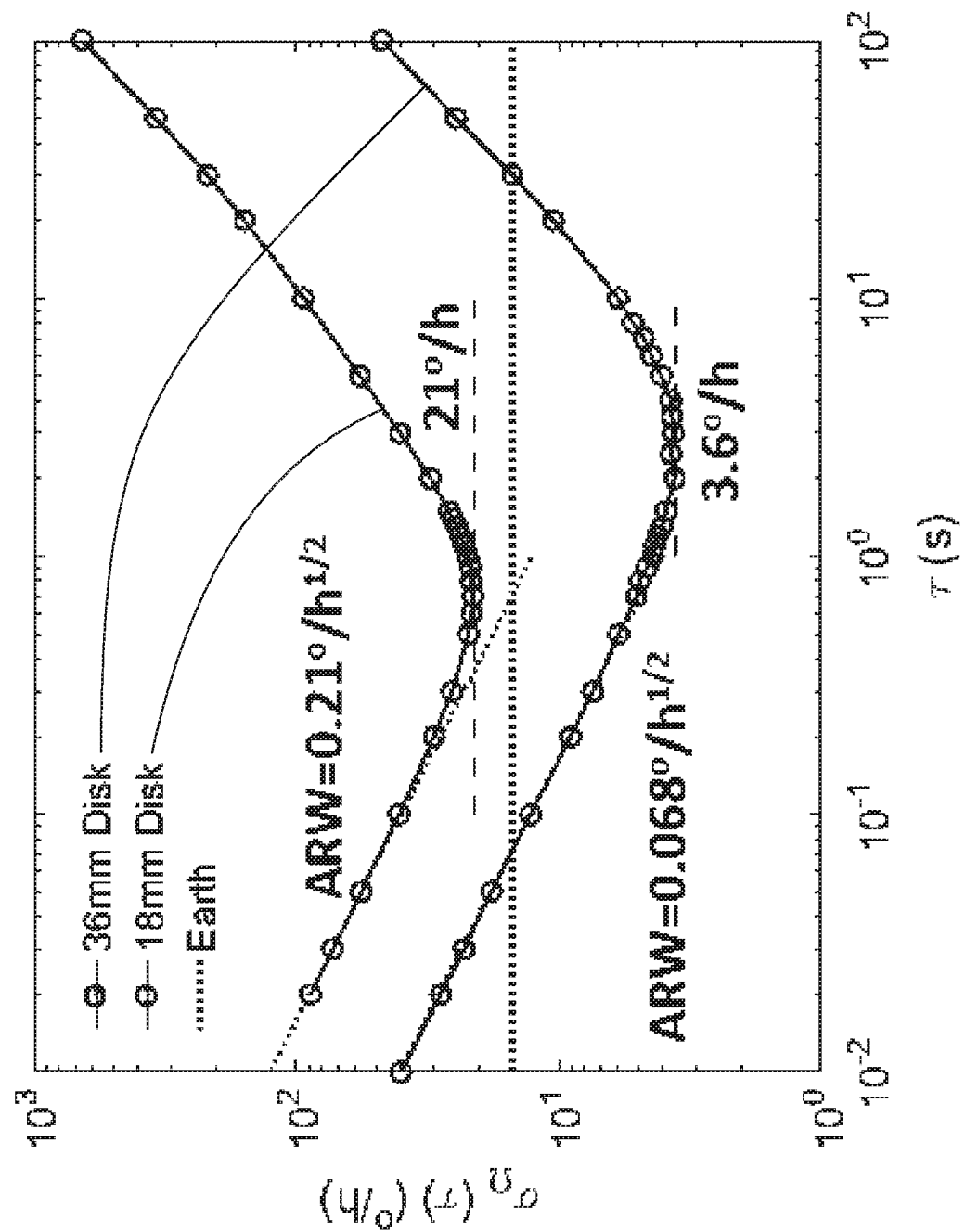
FIG. 5 includes plots of Allan deviation data for two example ring laser gyroscopes.

The graphs of FIG. 5 are plots of Allan deviation data showing an exhibited an angular drift rate (i) less than about 50. °/hr over timescales of about 0.10 second to about $1.0\times10^2$ seconds in one example (using an 18 mm silica disk resonator 100; upper plot), and (ii) less than about 5. °/hr over timescales of about 0.10 second to about 10. seconds (using a 36 mm diameter silica disk resonator 100; lower plot). For comparison, earth's rotation rate is 15°/hr. In some examples, further reduction of longer-term drift can be achieved by correcting the beat signal (at $\Delta\nu_L$) from the counterpropagating Brillouin laser signals 21/22 using a beat signal generated using copropagating pump and Brillouin laser signals (e.g., $\nu_{P1}$ and $\nu_{L1}$) to correct for signal components not arising from angular velocity of the gyroscope. Such correction can be implemented as post-acquisition processing of data, or can be implemented in hardware by suitable combination of the corresponding beat signals before processing the data. In one example, linear frequency drift in the dual-Brillouin-laser and pump-Brillouin-laser beat signals is removed; then the pump-Brillouin-laser beat signal is then scaled to correct the dual-Brillouin-laser beat signal by minimizing the standard deviation of the gyroscope read-out signal.

It is not only necessary to accurately determine the null beat frequency $\Delta\nu_{L0}$, the null beat frequency $\Delta\nu_{L0}$ should also be sufficiently stable to yield accurate angular velocity measurements over time. In some examples, stability of the value of $\Delta\nu_{L0}$ can be enhanced, e.g., by enclosing the resonator 200 within a temperature-stabilized housing. In some examples, temperature of the resonator 200 can be maintained within about ±0.010° C., within about ±0.10° C., or within about ±1.0° C. of a selected target temperature, depending on a drift rate that can be tolerated in a given application.

It has also been observed that the null beat frequency $\Delta\nu_{L0}$ can vary depending on Brillouin laser power density of, or mismatch of power density between, the counterpropagating Brillouin laser oscillations. It has also been observed that stabilizing and balancing those counterpropagating power densities appears to reduce drift of the gyroscope due to unwanted variation of the null beat frequency $\Delta\nu_{L0}$. Accordingly, the laser source 200 can be arranged to control the corresponding pump power levels of the pump optical signals 11/12 so as to in turn control corresponding power levels of the stimulated Brillouin laser signals 21/22; servo control can be employed based on electrical signals 31/32 form the photodetectors 301/302. In some examples modulation efficiency of the modulators 211 and/or 212 can be altered to alter the relative pump power levels. In some examples the laser source 200 can include variable optical attenuators 221/222 that are servo controlled based on the signals 31/32 from the photodetectors 301/302, respectively, and can include a servo mechanism for stabilizing the respective optical power levels of the counterpropagating stimulated Brillouin laser optical signals 21/22. The variable optical attenuators also can be set so that those stabilized power levels are substantially balanced; in some examples, those corresponding optical power levels of the first and second stimulated Brillouin laser output optical signals 21/22 are within about ±1.0%, within about ±5.0%, within about ±10.%, within about ±25%, or within about ±50% of each other, depending on a drift rate that can be tolerated in a given application.

In addition to the preceding, the following example embodiments fall within the scope of the present disclosure or appended claims:

Example 1. A ring laser gyroscope comprising: (a) a disk optical resonator (i) characterized by a free spectral range $\nu_{FSR}$, a finesse F, and a Brillouin shift frequency $\nu_B$, and (ii)

arranged so that corresponding optical frequencies of at least one pair of resonant optical modes supported by the disk optical resonator differ by about $v_B$; (b) a pump laser source that is arranged so as to (i) produce a first pump optical signal characterized by a first pump optical frequency $v_{P1}$ and launch at least a portion thereof to propagate around the disk optical resonator in a forward direction, and (ii) produce a second pump optical signal characterized by a second pump optical frequency $v_{P2}$ and launch at least a portion thereof to propagate around the disk optical resonator in a backward direction, wherein $v_{P1}$ and $v_{P2}$ are separated by a pump frequency offset $\Delta v_P$ that is between about $0.0010 \cdot v_{FSR}/F$ and about $10 \cdot v_{FSR}/F$, and either $v_{P2}=v_{P1}+\Delta v_P$ or $v_{P2}=v_{P1}-\Delta v_P$; (c) a frequency-locking mechanism coupling the pump laser source and the disk optical resonator and arranged so as to control the first pump optical frequency $v_{P1}$, the second pump optical frequency $v_{P2}$, or a laser optical frequency $v_{P0}$ to maintain resonant propagation around the disk optical resonator of at least a portion of the first pump optical signal, at least a portion of the second pump optical signal, or at least a portion of a laser output optical signal characterized by the laser optical frequency $v_{P0}$; and (d) a photodetector arranged so as to (i) receive a first stimulated Brillouin laser output optical signal, resulting from pumping by the first pump optical signal, that resonantly propagates around the disk optical resonator in the backward direction and is characterized by a first Brillouin laser frequency $v_{L1}$ that is about equal to $v_{P1}-v_B$, (ii) receive second stimulated Brillouin laser output optical signal, resulting from pumping by the second pump optical signal, that resonantly propagates around the disk optical resonator in the forward direction and is characterized by a second Brillouin laser frequency $v_{L2}$ that is about equal to $v_{P2}-v_B$, and (iii) produce from the received laser output optical signals an electrical output signal at a beat frequency $\Delta v_L=|v_{L1}-v_{L2}|$ with $0<\Delta v_L<\Delta v_P$.

Example 2. The apparatus of Example 1 wherein $\Delta v_P$ is sufficiently large so as to substantially prevent locking of the first and second Brillouin laser optical output signals onto a common Brillouin laser frequency and thereby maintain $v_{L1} \neq v_{L2}$.

Example 3. The apparatus of any one of Examples 1 or 2 further comprising a signal processing system coupled to the photodetector and arranged to derive from the beat frequency $\Delta v_L$ of the output electrical signal an estimated angular velocity component of the disk optical resonator about an axis substantially perpendicular to the disk optical resonator.

Example 4. The apparatus of Example 3 wherein the signal processing system is characterized by (i) a null beat frequency $\Delta v_{L0}$ that corresponds to the angular velocity component being zero, and (ii) a scale factor K selected so that the estimated angular velocity component is given by $K \cdot (\Delta v_L - \Delta v_{L0})$.

Example 5. The apparatus of any one of Examples 3 or 4 wherein the signal processing system includes an electrical spectrum analyzer or a frequency counter.

Example 6. The apparatus of any one of Examples 1 through 5 wherein (i) the pump laser source includes two or more optical modulators driven at two different modulator frequencies $f_{M1}$ and $f_{M2}$, (ii) the pump laser source includes a pump laser arranged so as to produce the laser output optical signal, (iii) the two or more modulators are arranged so as to receive at least a portion of the laser output optical signal and generate therefrom sideband optical signals characterized by corresponding sideband optical frequencies $v_{P0} \pm f_{M1}$ and $v_{P0} \pm f_{M2}$, (iv) the first pump optical signal is the sideband optical signal characterized by the sideband optical frequency $v_{P0} \pm f_{M1}=v_{P1}$, (v) the second pump optical signal is the sideband optical signal characterized by the sideband optical frequency $v_{P0} \pm f_{M2}=v_{P2}$, and (vi) either $\Delta v_P=f_{M1}+f_{M2}$ or $\Delta v_P=|f_{M1}-f_{M2}|$.

Example 7. The apparatus of any one of Examples 1 through 5 wherein (i) the pump laser source includes one or more optical modulators driven at a modulator frequency $f_M$, (ii) the pump laser source includes a pump laser arranged so as to produce the laser output optical signal, (iii) the one or more modulators are arranged so as to receive at least a portion of the laser output optical signal and generate therefrom sideband optical signals characterized by corresponding sideband optical frequencies $v_{P0} \pm f_M$, and (iv) at least one of the first or second pump optical signals is one of the sideband optical signals.

Example 8. The apparatus of Example 7 wherein (i) the first pump optical signal is the sideband optical signal characterized by the sideband optical frequency $v_{P0}+f_M=v_{P1}$, (ii) the second pump optical signal is the sideband optical signal characterized by the sideband optical frequency $v_{P0}-f_M=v_{P2}$, and (iii) $\Delta v_P=2 \cdot f_M$.

Example 9. The apparatus of Example 7 wherein (i) the first pump optical signal is a portion of the laser output optical signal and is characterized by the laser optical frequency $v_{P0}=v_{P1}$, (ii) the second pump optical signal is either the sideband optical signal characterized by the sideband optical frequency $v_{P0}+f_M=v_{P2}$ or the sideband optical signal characterized by the sideband optical frequency $v_{P0}-f_M=v_{P2}$, and (iii) $\Delta v_P=f_M$.

Example 10. The apparatus of any one of Examples 6 through 9 wherein the one or more optical modulators includes one or more phase modulators, acousto-optic modulators, electro-optic modulators, intensity modulators, quadrature phase-shift keying modulators, or single-sideband modulators.

Example 11. The apparatus of any one of Examples 7 through 10 wherein the pump laser source includes a reference frequency source that produces a reference electrical signal characterized by the modulator frequency $f_M$ and applies the reference electrical signal to the one or more modulators.

Example 12. The apparatus of Example 11 wherein the reference frequency source includes a crystal quartz oscillator or an atomic clock.

Example 13. The apparatus of any one of Examples 7 through 12 wherein the frequency-locking mechanism is arranged either (i) so as to control the first pump optical frequency $v_{P1}=v_{P0}+f_M$ to maintain resonant propagation around the disk optical resonator of at least a portion of the first pump optical signal, or (ii) so as to control the second pump optical frequency $v_{P2}=v_{P0}-f_M$ to maintain resonant propagation around the disk optical resonator of at least a portion of the second pump optical signal.

Example 14. The apparatus of any one of Examples 1 through 12 wherein the frequency-locking mechanism is arranged so as to control the laser optical frequency $v_{P0}$ to maintain resonant propagation around the disk optical resonator of at least a portion of the laser output optical signal.

Example 15. The apparatus of any one of Examples 1 through 14 wherein the frequency-locking mechanism includes a Pound-Drever-Hall mechanism or a Hänsch-Couillaud mechanism.

Example 16. The apparatus of any one of Examples 1 through 15 wherein the pump laser source includes a semiconductor laser, a semiconductor amplifier, an optical fiber laser, or a doped fiber amplifier.

Example 17. The apparatus of any one of Examples 1 through 16 wherein the apparatus is arranged so that corresponding optical power levels of the first and second stimulated Brillouin laser output optical signals are within ±50% of each other.

Example 18. The apparatus of any one of Examples 1 through 17 further comprising one or more variable optical attenuators arranged so as to enable selected alteration of relative optical power levels of the first and second pump optical signals and concomitant alteration of the optical power levels of the first and second stimulated Brillouin laser output optical signals.

Example 19. The apparatus of any one of Examples 1 through 18 further comprising one or more servo controllers arranged for controlling and stabilizing optical power levels of the first and second stimulated Brillouin laser output optical signals.

Example 20. The apparatus of any one of Examples 1 through 19 further comprising a temperature-stabilized housing enclosing at least the disk optical resonator.

Example 21. The apparatus of Example 20 wherein the temperature-stabilized housing is arranged so as to maintain temperature of the disk optical resonator within about ±0.010° C., within about ±0.10° C., or within about ±1.0° C. of a selected target temperature.

Example 22. The apparatus of any one of Examples 1 through 21 wherein the laser optical frequency $v_{P0}$ is between about 75 THz and about 750 THz, between about 120 THz and about 430 THz, or between about 150 THz and about 300 THz.

Example 23. The apparatus of any one of Examples 1 through 22 wherein the disk optical resonator comprises silica or doped silica, and the Brillouin shift frequency $v_B$ is about 10.8 GHz.

Example 24. The apparatus of any one of Examples 1 through 23 wherein the Brillouin shift frequency vs is about equal to an integer multiple of the free spectral range $v_{FSR}$.

Example 25. The apparatus of any one of Examples 1 through 24 wherein the Brillouin shift frequency $v_B$ is less than 20 times larger than the free spectral range $v_{FSR}$.

Example 26. The apparatus of any one of Examples 1 through 25 wherein the free spectral range $v_{FSR}$ is between about 0.10 GHz and about 20. GHz.

Example 27. The apparatus of any one of Examples 1 through 26 wherein the disk optical resonator characterized by a quality factor Q that is between about $1.0 \times 10^5$ and about $1.0 \times 10^{11}$.

Example 28. The apparatus of any one of Examples 1 through 27 wherein the disk optical resonator characterized by a quality factor Q that is between about $1.0 \times 10^7$ and about $1.0 \times 10^9$.

Example 29. The apparatus of any one of Examples 1 through 28 wherein $\Delta v_P$ is greater than about $0.010 \cdot v_{FSR}/F$ or less than about $v_{FSR}/F$.

Example 30. The apparatus of any one of Examples 1 through 29 wherein (i) the disk optical resonator comprises silica or doped silica, (ii) the Brillouin shift frequency $v_B$ is about 10.8 GHz, (iii) the free spectral range $v_{FSR}$ is between about 0.10 GHz and about 20. GHz, (iv) the disk optical resonator characterized by a quality factor Q that is greater than about $1.0 \times 10^8$, (v) the laser optical frequency $v_{P0}$ is between about $1.5 \times 10^{14}$ Hz and about $3.0 \times 10^{14}$ Hz, (vi) $\Delta v_P$ is between about 1.0 kHz and about 1.0 MHz, and (vii) $\Delta v_L$ is between about $v_P/100$. and about $\Delta v_P/5$.

Example 31. The apparatus of any one of Examples 1 through 30 wherein the ring laser gyroscope exhibits an angular drift rate of less than about 50. °/hr over timescales of about 0.10 second to about $1.0 \times 10^2$ seconds.

Example 32. The apparatus of any one of Examples 1 through 31 wherein the ring laser gyroscope exhibits an angular drift rate of less than about 5. °/hr over timescales of about 0.10 second to about 10. seconds.

Example 33. The apparatus of any one of Examples 4 through 32 wherein $\Delta v_P$ is sufficiently small so that the signal processing system is characterized by a value for the scale factor K that is about 2 times larger, about three times larger, or about four times larger than a value of the scale factor K that characterizes the signal processing system with $\Delta v_P$ greater than about $0.10 \cdot v_{FSR}/F$.

Example 34. The apparatus of any one of Examples 3 through 33 wherein the signal processing system is structured, connected, programmed, or otherwise arranged so as to correct the electrical output signal of the photodetector using a beat signal generated from a selected one of the pump optical signals and a one of the Brillouin laser optical signals that copropagates with the selected pump optical signal.

Example 35. A method for using the apparatus of any one of Examples 4 through 34 comprising calibrating the apparatus by determining values for $\Delta v_{L0}$ and K.

Example 36. A method for using the apparatus of any one of Examples 4 through 34 to measure the estimated angular velocity component, the method comprising measuring the beat frequency $\Delta v_L$ and calculating the estimated angular velocity component as being equal to $K \cdot (\Delta v_L - \Delta v_{L0})$.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The article "a" shall be interpreted as "one or more" unless "only one," "a single," or other similar limitation is stated explicitly or is implicit in the particular context; similarly, the article "the"

shall be interpreted as "one or more of the" unless "only one of the," "a single one of the," or other similar limitation is stated explicitly or is implicit in the particular context. The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. Similarly, "one or more of a dog or a cat" would be interpreted as including (i) one or more dogs without any cats, (ii) one or more cats without any dogs, or (iii) one or more dogs and one or more cats, unless explicitly stated otherwise or the alternatives are understood or disclosed (implicitly or explicitly) to be mutually exclusive or incompatible. Similarly, "one or more of a dog, a cat, or a mouse" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. "Two or more of a dog, a cat, or a mouse" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted. For any of the preceding recitations, if any pairs or combinations of the included alternatives are understood or disclosed (implicitly or explicitly) to be incompatible or mutually exclusive, such pairs or combinations are understood to be excluded from the corresponding recitation. For purposes of the present disclosure and appended claims, the words "comprising," "including," "having," and variants thereof, wherever they appear, shall be construed as open ended terminology, with the same meaning as if a phrase such as "at least" were appended after each instance thereof, unless explicitly stated otherwise.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A ring laser gyroscope comprising:
   (a) a disk optical resonator (i) characterized by a free spectral range $v_{FSR}$, a finesse F, and a Brillouin shift frequency $v_B$, and (ii) arranged so that corresponding optical frequencies of at least one pair of resonant optical modes supported by the disk optical resonator differ by about $v_B$;
   (b) a pump laser source that is arranged so as to (i) produce a first pump optical signal characterized by a first pump optical frequency $v_{P1}$ and launch at least a portion thereof to propagate around the disk optical resonator in a forward direction, and (ii) produce a second pump optical signal characterized by a second pump optical frequency $v_{P2}$ and launch at least a portion thereof to propagate around the disk optical resonator in a backward direction, wherein $v_{P1}$ and $v_{P2}$ are separated by a pump frequency offset $\Delta v_P$ that is between about $0.0010 \cdot v_{FSR}/F$ and about $10 \cdot v_{FSR}/F$, and either $v_{P2} = v_{P1} + \Delta v_P$ or $v_{P2} = v_{P1} - \Delta v_P$;
   (c) a frequency-locking mechanism coupling the pump laser source and the disk optical resonator and arranged so as to control the first pump optical frequency $v_{P1}$, the second pump optical frequency $v_{P2}$, or a laser optical frequency $v_{P0}$ to maintain resonant propagation around the disk optical resonator of at least a portion of the first pump optical signal, at least a portion of the second pump optical signal, or at least a portion of a laser output optical signal characterized by the laser optical frequency $v_{P0}$; and
   (d) a photodetector arranged so as to (i) receive a first stimulated Brillouin laser output optical signal, resulting from pumping by the first pump optical signal, that resonantly propagates around the disk optical resonator in the backward direction and is characterized by a first Brillouin laser frequency $v_{L1}$ that is about equal to $v_{P1} - v_B$, (ii) receive second stimulated Brillouin laser output optical signal, resulting from pumping by the second pump optical signal, that resonantly propagates around the disk optical resonator in the forward direction and is characterized by a second Brillouin laser frequency $v_{L2}$ that is about equal to $v_{P2}-v_B$, and (iii) produce from the received laser output optical signals an electrical output signal at a beat frequency $\Delta v_L = |v_{L1} - v_{L2}|$ with $0 < \Delta v_L < \Delta v_P$.

2. The apparatus of claim 1 wherein $\Delta v_P$ is sufficiently large so as to substantially prevent locking of the first and second Brillouin laser optical output signals onto a common Brillouin laser frequency and thereby maintain $v_{L1} \neq v_{L2}$.

3. The apparatus of claim 1 further comprising a signal processing system coupled to the photodetector and arranged to derive from the beat frequency $\Delta v_L$ of the output electrical signal an estimated angular velocity component of the disk optical resonator about an axis substantially perpendicular to the disk optical resonator.

4. The apparatus of claim 3 wherein the signal processing system is characterized by (i) a null beat frequency $\Delta v_{L0}$ that corresponds to the angular velocity component being zero, and (ii) a scale factor K selected so that the estimated angular velocity component is given by $K \cdot (\Delta v_L - \Delta v_{L0})$.

5. The apparatus of claim 3 wherein the signal processing system includes an electrical spectrum analyzer or a frequency counter.

6. A method for using the apparatus of claim 3 comprising calibrating the apparatus by determining values for $\Delta v_{L0}$ and K.

7. A method for using the apparatus of claim 3 to measure the estimated angular velocity component, the method comprising measuring the beat frequency $\Delta v_L$ and calculating the estimated angular velocity component as being equal to $K \cdot (\Delta v_L - \Delta v_{L0})$.

8. The apparatus of claim 1 wherein (i) the pump laser source includes two or more optical modulators driven at two different modulator frequencies $f_{M1}$ and $f_{M2}$, (ii) the pump laser source includes a pump laser arranged so as to produce the laser output optical signal, (iii) the two or more modulators are arranged so as to receive at least a portion of the laser output optical signal and generate therefrom sideband optical signals characterized by corresponding sideband optical frequencies $v_{P0} \pm f_{M1}$ and $v_{P0} \pm f_{M2}$, (iv) the first pump optical signal is the sideband optical signal characterized by the sideband optical frequency $v_{P0} \pm f_{M1} = v_{P1}$, (v) the second pump optical signal is the sideband optical signal characterized by the sideband optical frequency $v_{P0} \pm f_{M2} = v_{P2}$, and (vi) either $\Delta v_P = f_{M1} + f_{M2}$ or $\Delta v_P = |f_{M1} - f_{M2}|$.

9. The apparatus of claim 1 wherein (i) the pump laser source includes one or more optical modulators driven at a modulator frequency $f_M$, (ii) the pump laser source includes a pump laser arranged so as to produce the laser output optical signal, (iii) the one or more modulators are arranged so as to receive at least a portion of the laser output optical signal and generate therefrom sideband optical signals characterized by corresponding sideband optical frequencies $v_{P0} \pm f_M$, and (iv) at least one of the first or second pump optical signals is one of the sideband optical signals.

10. The apparatus of claim 9 wherein (i) the first pump optical signal is the sideband optical signal characterized by the sideband optical frequency $v_{P0} + f_M = v_{P1}$, (ii) the second pump optical signal is the sideband optical signal characterized by the sideband optical frequency $v_{P0} - f_M = v_{P2}$, and (iii) $\Delta v_P = 2 \cdot f_M$.

11. The apparatus of claim 9 wherein (i) the first pump optical signal is a portion of the laser output optical signal and is characterized by the laser optical frequency $v_{P0} = v_{P1}$, (ii) the second pump optical signal is either the sideband optical signal characterized by the sideband optical frequency $v_{P0} + f_M = v_{P2}$ or the sideband optical signal characterized by the sideband optical frequency $v_{P0} - f_M = v_{P2}$, and (iii) $\Delta v_P = f_M$.

12. The apparatus of claim 9 wherein the one or more optical modulators includes one or more phase modulators, acousto-optic modulators, electro-optic modulators, intensity modulators, quadrature phase-shift keying modulators, or single-sideband modulators.

13. The apparatus of claim 9 wherein the pump laser source includes a reference frequency source that produces a reference electrical signal characterized by the modulator frequency $f_M$ and applies the reference electrical signal to the one or more modulators.

14. The apparatus of claim 13 wherein the reference frequency source includes a crystal quartz oscillator or an atomic clock.

15. The apparatus of claim 9 wherein the frequency-locking mechanism is arranged either (i) so as to control the first pump optical frequency $v_{P1} = v_{P0} + f_M$ to maintain resonant propagation around the disk optical resonator of at least a portion of the first pump optical signal, or (ii) so as to control the second pump optical frequency $v_{P2} = v_{P0} - f_M$ to maintain resonant propagation around the disk optical resonator of at least a portion of the second pump optical signal.

16. The apparatus of claim 1 wherein the frequency-locking mechanism is arranged so as to control the laser optical frequency $v_{P0}$ to maintain resonant propagation around the disk optical resonator of at least a portion of the laser output optical signal.

17. The apparatus of claim 1 wherein the frequency-locking mechanism includes a Pound-Drever-Hall mechanism or a Hänsch-Couillaud mechanism.

18. The apparatus of claim 1 wherein the pump laser source includes a semiconductor laser, a semiconductor amplifier, an optical fiber laser, or a doped fiber amplifier.

19. The apparatus of claim 1 wherein the apparatus is arranged so that corresponding optical power levels of the first and second stimulated Brillouin laser output optical signals are within ±50% of each other.

20. The apparatus of claim 1 further comprising one or more variable optical attenuators arranged so as to enable selected alteration of relative optical power levels of the first and second pump optical signals and concomitant alteration of the optical power levels of the first and second stimulated Brillouin laser output optical signals.

21. The apparatus of claim 1 further comprising one or more servo controllers arranged for controlling and stabilizing optical power levels of the first and second stimulated Brillouin laser output optical signals.

22. The apparatus of claim 1 further comprising a temperature-stabilized housing enclosing at least the disk optical resonator.

23. The apparatus of claim 1 wherein the laser optical frequency $v_{P0}$ is between about 75 THz and about 750 THz.

24. The apparatus of claim 1 wherein the disk optical resonator comprises silica or doped silica, and the Brillouin shift frequency $v_B$ is about 10.8 GHz.

25. The apparatus of claim 1 wherein the Brillouin shift frequency $v_B$ is about equal to an integer multiple of the free spectral range $v_{FSR}$.

26. The apparatus of claim 1 wherein the Brillouin shift frequency $v_B$ is less than 20 times larger than the free spectral range $v_{FSR}$.

27. The apparatus of claim 1 wherein the free spectral range $v_{FSR}$ is between about 0.10 GHz and about 20. GHz.

28. The apparatus of claim 1 wherein the disk optical resonator characterized by a quality factor Q that is between about $1.0\times10^5$ and about $1.0\times10^{11}$.

29. The apparatus of claim 1 wherein the disk optical resonator characterized by a quality factor Q that is between about $1.0\times10^7$ and about $1.0\times10^9$.

30. The apparatus of claim 1 wherein $\Delta v_P$ is greater than about $0.010 \cdot v_{FSR}/F$ or less than about $v_{FSR}/F$.

31. The apparatus of claim 1 wherein (i) the disk optical resonator comprises silica or doped silica, (ii) the Brillouin shift frequency $v_B$ is about 10.8 GHz, (iii) the free spectral range $v_{FSR}$ is between about 0.10 GHz and about 20. GHz, (iv) the disk optical resonator characterized by a quality factor Q that is greater than about $1.0\times10^9$, (v) the laser optical frequency $v_{P0}$ is between about $1.5\times10^{14}$ Hz and about $3.0\times10^{14}$ Hz, (vi) $\Delta v_P$ is between about 1.0 kHz and about 1.0 MHz, and (vii) $\Delta v_L$ is between about $\Delta v_P/100$. and about $\Delta v_P/5$.

32. The apparatus of claim 1 wherein the ring laser gyroscope exhibits an angular drift rate of less than about 50.°/hr over timescales of about 0.10 second to about $1.0\times10^2$ seconds.

33. The apparatus of claim 1 wherein the ring laser gyroscope exhibits an angular drift rate of less than about 5.°/hr over timescales of about 0.10 second to about 10. seconds.

* * * * *